United States Patent [19]

Kubota et al.

[11] 4,318,143
[45] Mar. 2, 1982

[54] VIDEO SIGNAL RECORDING-REPRODUCTION APPARATUS

[75] Inventors: Takashi Kubota, Mito; Shinya Ichimura, Katsuta, both of Japan

[73] Assignee: Hitachi, Ltd., Tokyo, Japan

[21] Appl. No.: 77,837

[22] Filed: Sep. 21, 1979

[30] Foreign Application Priority Data

Sep. 22, 1978 [JP] Japan .................. 53-115788

[51] Int. Cl.³ .............................. G11B 21/00
[52] U.S. Cl. ........................ 360/84; 360/10; 360/107; 360/119; 360/33
[58] Field of Search ............ 360/10, 33, 84, 122, 360/119, 107, 101

[56] References Cited

U.S. PATENT DOCUMENTS 3,821,787  6/1974  Kihara ............................. 360/70
3,911,483 10/1975  Kihara ............................ 360/122
3,925,816 12/1975  Kihara ............................. 360/19

FOREIGN PATENT DOCUMENTS 2814082 10/1978  Fed. Rep. of Germany ........ 360/21
7801929  8/1978  Netherlands ..................... 360/21

Primary Examiner—Bernard Konick
Assistant Examiner—Alan Faber
Attorney, Agent, or Firm—Craig and Antonelli

[57] ABSTRACT

A two-head helical scan type video tape recorder comprises two rotary heads having different gap widths each larger than the pitch of the recording gap. The track widths of the two heads are set at 5/4·T and 3/2·T respectively where T is the pitch of the tracks recorded on the magnetic tape. This configuration provides a compatibility with a video tape recorder of helical scan type in which each gap width of the two heads is T which is equal to the track pitch T.

2 Claims, 7 Drawing Figures

VIDEO SIGNAL RECORDING-REPRODUCTION APPARATUS

FIELD OF THE INVENTION

The present invention relates to a video tape recorder of the 2-head helical scan type, or more in particular to a video tape recorder of the 2-head helical scan type in which there is provided no guard band between adjacent video signal tracks at the time of recording on the magnetic tape, and which is suitable for reproduction at either the same tape speed as or a different tape speed from the recording speed.

DESCRIPTION OF THE PRIOR ART

Figure 1:
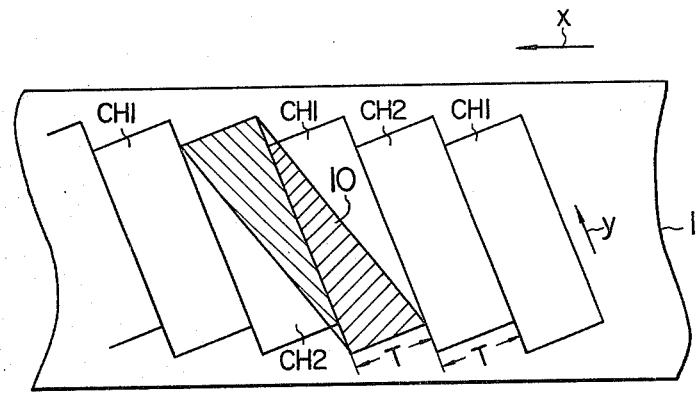
FIG. 1 shows an example of a recording pattern on the magnetic tape and a tracing locus of the heads for reproduction of a still image, in a conventional video tape recorder of helical scan type without any guard bands.

The diagram of FIG. 1 shows a locus of recording made on the magnetic tape without any guard bands by a video tape recorder of the 2-head helical scan type. In this drawing, to facilitate understanding, the relative widths of the magnetic tape and the tracks and the inclination angle of the tracks are considerably different from the actual values. This is also the case with all the other similar drawings. The head-running locus of FIG. 1 concerns what is called still image reproduction in which reproduction is made with the rotary head actuated while keeping the tape stationary.

In FIG. 1, reference numeral 1 shows the magnetic tape, CH1 a recording track formed by one of the two heads, and CH2 a recording track formed by the other head. The width T of the tracks CH1 and CH2 is generally equal to the gap width of the head, and the tape running speed is set in such a manner that the gap pitch is equal to the head track width. In this way, tracks are formed close to each other without any guard bands therebetween. The head gap width is defined as a substantial width capable of being recorded with signals but not the outline width of the head. Especially in the case of a home video tape recorder, the gap width is very small (not more than 100 μm) and therefore if the width of the head is substantially equal to the gap width, the head tends to easily break. To prevent this, it is common practice to enlarge the head width while the gap width alone is made as narrow as the track width. In this case, the effective width of the head is considerably different from that of the head outline.

The direction in which the magnetic tape 1 is fed is shown by arrow x and the direction of rotation of the heads by arrow y. In the case where reproduction is made with the magnetic tape 1 kept stationary, the rotary heads form a tracing locus as shown by a shadowed part 10. In other words, the same locus is formed by the two heads over two adjacent recording tracks.

In the case of recording without any guard band between recording tracks as shown in the drawing, the two heads have different gap angles in order to avoid any crosstalk between adjacent tracks at the time of reproduction. On the other hand, the gap angle of each magnetic head is generally set at right angles to the longitudinal direction of the recording track in the case where a guard band is provided between adjacent tracks. According to the video tape recorder under consideration, however, the gaps of the two heads are inclined in different directions from the line perpendicular to the tracks by, for example, ±6 degrees (That is, the azimuth angles are differentiated). When signals are read from the tracks recorded with heads of different azimuth angles, the reproduction signal is reduced extremely due to the azimuth loss, whereas if signals are read from the tape with heads of the same azimuth angle, there occurs no azimuth loss, thus reducing the crosstalks from adjacent tracks. As a result, the guard bands are eliminated so that the utilization rate of the magnetic tape is improved, thus making possible long-time recording.

Figure 2:
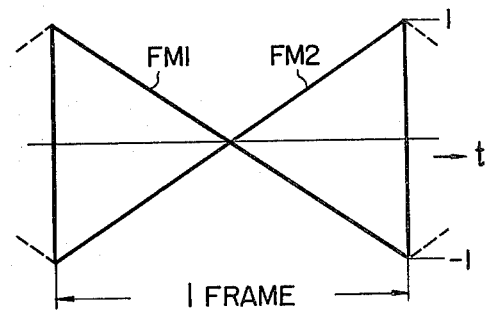
FIG. 2 is a waveform diagram showing an example of the envelope of a head-read output signal for reproduction of a still image according to a conventional video recorder.

In the case of still image reproduction where reproduction is made with the magnetic tape kept stationary, however, the two heads form the same locus over two recording tracks as mentioned above. Since the two heads have different azimuth angles, one head reads only those signals from the track where recording is made by the head of the same azimuth angle. In the case of the tracing locus of still image reproduction, therefore, the envelope of a frame of signal read takes the waveform as shown in FIG. 2. More specifically, the signal read from one track CH1 has a waveform as shown in FM1 where with the advance of tracing, the head is displaced out of the track increasingly resulting in a decreased amplitude. The output of the other head, on the other hand, is read from the track CH2. The tracing of the other head, which is displaced out of the track initially, is increasingly placed on track, with the result that the output changes from zero to a larger amplitude as shown by the waveform FM2.

In video tape recorders, the video signal is generally recorded in the form of frequency-modulated signal. In the process of reproduction, therefore, an amplitude limiter circuit is used as well known and therefore the reduction in amplitude is compensated for to some degree. When the output read becomes substantially zero, however, the video signal cannot be reproduced and a noise band is displayed as a drop-out on the reproduction screen.

SUMMARY OF THE INVENTION

An object of the present invention is to provide a novel video tape recorder in which in the case of still image reproduction, the beat interference from adjacent-but-one tracks is minimized on the one hand and in the case of ordinary motion reproduction, the reduction in S/N ratio is minimized on the other hand, thus eliminating the drop-out noises which otherwise might be caused in still image reproduction, and which is compatible with conventional video tape recorders.

In order to achieve the above-mentioned object, according to the present invention, there is provided a video tape recorder in which the two heads have a gap width which is larger than the track pitch, and the gap widths of the heads for recording or reproduction are different from each other. It is most desirable for one of the heads to have a gap width of about 5/4T and the other head about $(3/2) \cdot T$ where T is the width of the recording track which is equal to the track pitch in the absence of a guard band.

DESCRIPTION OF THE PREFERRED EMBODIMENTS

Figure 3:
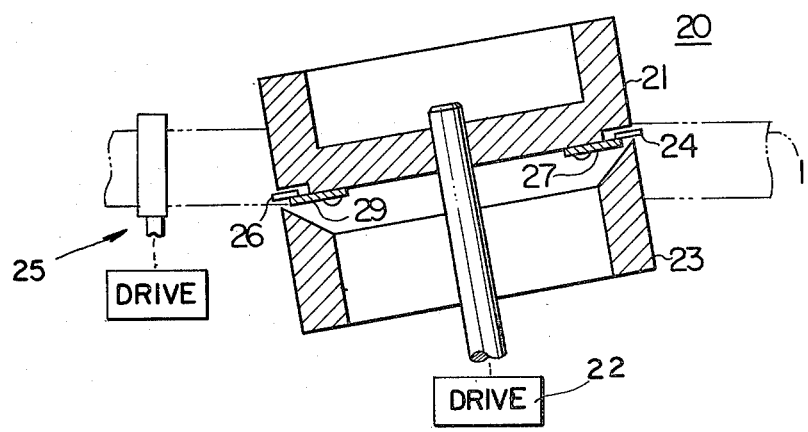
FIG. 3 is a cross sectional view showing an example of the construction of a rotary head of helical scan type according to the present invention.

The diagram of FIG. 3 shows schematically a cross sectional view of a rotary head device 20 used for a two-head helical scan type video tape recorder. In this device 20, it is well known that a stationary cylinder 23 fixed on the chassis and a rotary cylinder 21 arranged coaxially with the stationary cylinder 23 make up a guide for guiding the magnetic tape 1 helically. A drive 22 drives the cylinder 21 in rotation about its axis. Two video heads 24 and 26 are mounted on the rotary cylinder 21 by means of head fixing bases 27 and 29 respectively. A conventional capstan drive arrangement 25 provides for movement of the magnetic tape at the desired speed.

Figure 4A:
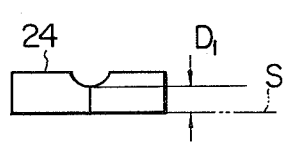
FIGS. 4a and 4b are front views showing an example of tape slide surfaces for two video heads used with the video tape recorder according to the present invention.
Figure 4B:
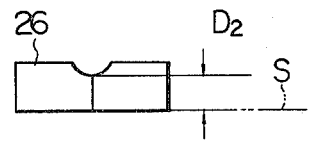

The features of this invention reside in that the video heads 24 and 26 of the rotary head device 20 have different gap widths and that both of the gap widths are larger than the width of the recording track. In other words, both the video heads 24 and 26 have a wider magnetic gap than the track pitch of the recording track. As shown in FIGS. 4a and 4b, the two video heads 24 and 26 have different gap widths, i.e., different gap widths $D_1$ and $D_2$. Further, the video heads 24 and 26 are mounted on the rotary cylinder 21 in such a manner that the reference levels S thereof coincide with each other. The most desirable result is obtained when the gap width $D_1$ of one video head 24 is set at $(5/4) \cdot T$ and the gap width $D_2$ of the other video head 26 at $(3/2) \cdot T$, where T is the track pitch.

Figure 5:
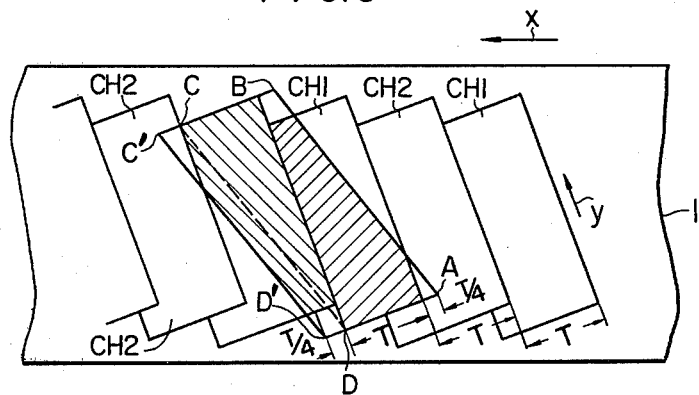
FIG. 5 shows a recording pattern recorded on the magnetic tape and a tracing locus of a still image reproduction according to an embodiment of the present invention.

A recording pattern on the magnetic tape and the tracing locus of the heads for still reproduction fulfilling such a condition are shown in FIG. 5. In FIG. 5, CH1 shows tracks recorded by the narrower video head 24 and CH2 the tracks recorded by the wider video head 26. The video heads 24 and 26 are arranged in such a manner that the reference levels S thereof coincide with each other as mentioned above. The heads have tracks wider than the track pitch T, and therefore part of each recording track is superposed on the next track, with the result that the previously recorded signal in the superposed part is rewritten by the newly recorded signal. The remaining parts of the recording tracks therefore have the same width T which is different from the gap width of the video heads.

Thus, the recording track according to this embodiment is substantially the same as that of the video tape recorder in which the head gap width is the same as that of the recording track without any guard band, thereby maintaining the compatibility with such video tape recorders.

Figure 6:
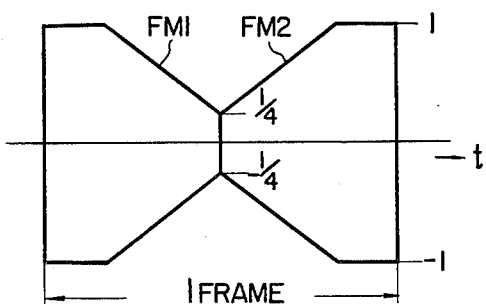
FIG. 6 is a waveform diagram showing an example of a head-read output signal for reproduction of a still image according to an embodiment of the present invention.

In the case of still image reproduction with the tape kept stationary, the tracing locus of the video heads is as shown by the shadowed part 12 in FIG. 5. Since the reference levels S of the two video heads coincide with each other, the side line AB of the tracing locus 12 is the same for the two heads, while the remaining side lines are as shown in dashed line CD and solid line C'D' respectively. Under this condition, the best reproduction image is obtained if as shown in FIG. 5, adjustment is made in such a manner as to displace the tracking by $\frac{1}{4}T$ at the starting end of the recording track CH1. The tracking for still image reproduction is adjustable merely by displacing the stationary magnetic tape slightly. In this way, the signal in the track CH1 is reproduced by the head that has recorded CH1, and the signal in the track CH2 by the wider head that has recorded CH2. As a result, signals can be read even at the starting or tail end of each track, thus leading to a signal envelope of the read output as shown in FIG. 6. In view of the fact that signals can be read even at the track ends, the reproduction output is reduced only to approximately one fourth of the peak value. In the course of processing of reproduction signals, this compensates for the reduction in amplitude to some degree thus preventing a noise band from being generated by a drop-out.

The track CH1 is read in the range of the head tracing locus 12 surrounded by ABCD, while the track CH2 is read in the range of the head tracing locus 12 surrounded by ABC'D'. As a result, the head tracing locus is superposed on each track in the same shape so that the envelopes FM1 and FM2 of the output read are balanced with each other between the two fields as shown in FIG. 6.

When a head having a gap sufficiently wider than the recording track is used in still image reproduction, the tracing locus of the heads is prevented from being displaced from the recording track. If the head is so wide that an adjacent-but-one track is traced at the same time, beat interferences occur. In other words, the adjacent-but-one track is recorded by the same head, and read without any azimuth loss. If there are some frequency differences between the two fields, therefore, a beat is generated in the form of an interference on the reproduction image. In the embodiment of the present invention under consideration, as seen from FIG. 5, the locus of the head reproducing the track CH1 is in the range surrounded by the four points A, B, C and D and therefore the adjacent-but-one tracks are not traced, thus generating no beat interference at all. Also, the locus of the head for reproduction of the track CH2 is in the range surrounded by ABC'D', and therefore an adjacent-but-one track is traced slightly at the area near point A, with the result that some beat interference occurs. This is so small, however, that it offers no practical problem.

It is desirable as mentioned above that the gap widths $D_1$ and $D_2$ of the video heads according to this embodiment be $(5/4) \cdot T$ and $(3/2) \cdot T$ respectively where T is the track pitch. If the actual values deviate slightly from these specified figures, however, no drop-out noise band occurs in the still image reproduction, so that a modification of the present invention is possible without increasing the beat interference from the adjacent-but-one tracks and at the same time without reducing the S/N ratio appreciably at normal tape speed.

We claim:
1. For use in a video tape recorder having a rotary head assembly of the helical scan type including two rotary magnetic heads and means for moving a mag- netic tape past said heads, a rotary head assembly comprising:

a first magnetic head having a gap width which is larger than the predetermined pitch of the tracks formed obliquely by helical scanning on the magnetic tape, a second magnetic head having a different gap width from the gap width of said first magnetic head, said gap width of said second magnetic head which is also larger than said track pitch, a corresponding end of the gap of said first and second magnetic heads being positioned in a manner to coincide with a common reference level; and means for rotating said first and second magnetic heads at a speed to helically scan the magnetic tape along tracks having said predetermined pitch.

2. For use in a video tape recorder having means for moving a magnetic tape past a rotary head assembly, a rotary head assembly of the two-head helical scan type comprising:

a first magnetic head having a gap with a width of approximately $(5/4) \cdot T$, where T is the pitch of the tracks formed obliquely on the magnetic tape by helical scan;

a second magnetic head having a gap with a width of approximately $(3/2) \cdot T$; and means for rotating said first and second magnetic heads at a speed to helically scan the magnetic tape along tracks having said pitch T, a corresponding end of the gaps of said first and second magnetic heads being arranged in a manner to coincide with a common reference level.

* * * * *